US012636859B2

(12) United States Patent
Lee et al.

(10) Patent No.: US 12,636,859 B2
(45) Date of Patent: May 26, 2026

(54) METHODS FOR BONDING PLASTICS AND COMPONENTS MADE BY THE SAME

(71) Applicant: Truvian Sciences, Inc., San Diego, CA (US)

(72) Inventors: Eumene Lee, San Diego, CA (US); Tyson Grant, San Diego, CA (US); Steven Quintero, San Diego, CA (US)

(73) Assignee: Truvian Sciences, Inc., San Diego, CA (US)

( * ) Notice: Subject to any disclaimer, the term of this patent is extended or adjusted under 35 U.S.C. 154(b) by 222 days.

(21) Appl. No.: 18/025,376

(22) PCT Filed: Sep. 22, 2021

(86) PCT No.: PCT/US2021/051512
§ 371 (c)(1),
(2) Date: Mar. 8, 2023

(87) PCT Pub. No.: WO2022/066741
PCT Pub. Date: Mar. 31, 2022

(65) Prior Publication Data
US 2024/0025147 A1 Jan. 25, 2024

Related U.S. Application Data

(60) Provisional application No. 63/081,588, filed on Sep. 22, 2020.

(51) Int. Cl.
*B32B 37/12* (2006.01)
*B32B 7/12* (2006.01)
(Continued)

(52) U.S. Cl.
CPC .............. *B32B 7/12* (2013.01); *B32B 27/325* (2013.01); *B32B 27/365* (2013.01); *B32B 37/12* (2013.01);
(Continued)

(58) Field of Classification Search
CPC . B32B 2250/24; B32B 2255/26; B32B 27/32; B32B 27/365; B32B 7/12; B32B 27/325; B32B 2307/40; B32B 2307/30
See application file for complete search history.

(56) References Cited

U.S. PATENT DOCUMENTS 4,042,462 A 8/1977 Johnson et al.
4,226,531 A 10/1980 Tiffany et al.
(Continued)

FOREIGN PATENT DOCUMENTS

CA 2959410 A1 11/2021
CN 1206832 A 2/1999
(Continued)

OTHER PUBLICATIONS

US 7,833,478 B2, 11/2010, Andersson (withdrawn)
(Continued)

*Primary Examiner* — Callie E Shosho
*Assistant Examiner* — Krupa Shukla
(74) *Attorney, Agent, or Firm* — Snell & Wilmer, L.L.P.; April Wurster

(57) ABSTRACT

Methods of bonding plastics are described herein. The method includes providing a substrate having a melting temperature in a first range, providing a bonding film having a melting temperature in the first range, providing an adhesive layer, providing an optical film having a melting temperature in a second range, laminating the bonding film, the adhesive layer, and optical film together, and bonding the laminate to the substrate. Another method includes providing the substrate and the optical film, coating the substrate with a thermal matching layer having a melting temperature in the second range, or coating the optical film with a thermal matching layer having a melting temperature in the first range, and bonding the thermal matching layer to the (Continued)

10

12

11
13
14
15 substrate or the optical film that is uncoated with the thermal matching layer. A difference between melting temperatures of the substrate and the optical film is about 50 to 250° F.

20 Claims, 1 Drawing Sheet

(51) Int. Cl.
    *B32B 27/32*         (2006.01)
    *B32B 27/36*         (2006.01)
    *B32B 37/26*         (2006.01)

(52) U.S. Cl.
    CPC .......... *B32B 37/26* (2013.01); *B32B 2250/24* (2013.01); *B32B 2307/308* (2013.01)

(56)           References Cited

U.S. PATENT DOCUMENTS

| | | | |
|---|---|---|---|
| 4,469,793 A | 9/1984 | Guigan | |
| 4,562,570 A | 12/1985 | Denton | |
| 4,652,137 A | 3/1987 | Calzi | |
| 4,656,009 A | 4/1987 | Benajam | |
| 4,788,139 A | 11/1988 | Ryan | |
| 4,911,642 A | 3/1990 | Knowles | |
| 4,990,075 A | 2/1991 | Wogoman | |
| 5,186,844 A | 2/1993 | Burd et al. | |
| D343,457 S | 1/1994 | Stalec | |
| 5,453,359 A | 9/1995 | Gargan | |
| D383,215 S | 9/1997 | Levy | |
| 5,693,233 A | 12/1997 | Schembri | |
| 5,888,592 A | 3/1999 | Biallas | |
| 6,006,911 A | 12/1999 | Levy | |
| 6,062,591 A | 5/2000 | Ruckdeschel et al. | |
| 6,143,248 A | 11/2000 | Kellogg et al. | |
| 6,165,795 A | 12/2000 | Mize | |
| 6,235,531 B1 | 5/2001 | Kopf-Sill et al. | |
| 6,302,134 B1 | 10/2001 | Kellogg et al. | |
| 6,399,361 B2 | 6/2002 | Brotherston et al. | |
| 6,548,788 B2 | 4/2003 | Kellogg et al. | |
| 6,563,584 B1 | 5/2003 | Yurrino et al. | |
| 6,582,662 B1 | 6/2003 | Kellogg et al. | |
| 6,632,399 B1 | 10/2003 | Kellogg et al. | |
| 6,637,463 B1 | 10/2003 | Lei et al. | |
| 6,752,961 B2 | 6/2004 | Kopf-Sill et al. | |
| 6,811,755 B2 | 11/2004 | McLuen et al. | |
| 6,818,435 B2 | 11/2004 | Carvalho et al. | |
| 6,819,408 B1 | 11/2004 | Scrivens et al. | |
| D501,678 S | 2/2005 | Oberhardt | |
| 6,872,572 B2 | 3/2005 | Brady et al. | |
| 6,935,638 B2 | 8/2005 | Ivanov et al. | |
| 7,094,354 B2 | 8/2006 | Pugia et al. | |
| 7,238,538 B2 | 7/2007 | Freitag et al. | |
| D598,121 S | 8/2009 | Lastella | |
| 7,736,890 B2 | 6/2010 | Sia et al. | |
| 7,790,110 B2 | 9/2010 | Cho et al. | |
| 7,794,849 B2 | 9/2010 | Lu et al. | |
| 7,947,186 B2 | 5/2011 | Soares et al. | |
| 7,991,262 B2 | 8/2011 | Ogawa et al. | |
| 7,998,411 B2 | 8/2011 | Kopf-Sill et al. | |
| 8,119,393 B2 | 2/2012 | Qinwei | |
| 8,212,227 B2 | 7/2012 | Watanabe et al. | |
| 8,221,701 B2 | 7/2012 | Cho et al. | |
| D672,050 S | 12/2012 | Lee et al. | |
| 8,372,357 B2 | 2/2013 | Andersson et al. | |
| D683,045 S | 5/2013 | Domack | |
| 8,731,721 B2 | 5/2014 | Heiner et al. | |
| 8,932,538 B2 | 1/2015 | Kim et al. | |
| 8,945,914 B1 | 2/2015 | Schaff et al. | |
| 8,962,346 B2 | 2/2015 | Schaff et al. | |
| 8,969,070 B2 | 3/2015 | Yoo | |
| 9,108,198 B2 | 8/2015 | Kim et al. | |
| 9,164,091 B2 | 10/2015 | Kim | |
| 9,176,112 B2 | 11/2015 | Zhang et al. | |
| 9,186,668 B1 | 11/2015 | Schaff et al. | |
| 9,186,672 B2 | 11/2015 | Amasia et al. | |
| 9,213,040 B2 | 12/2015 | Hwang et al. | |
| 9,244,065 B1 | 1/2016 | Schaff et al. | |
| 9,279,818 B2 | 3/2016 | Yoo | |
| 9,304,129 B2 | 4/2016 | Schaff et al. | |
| 9,410,127 B2 | 8/2016 | Kim et al. | |
| 9,421,541 B2 | 8/2016 | Moon et al. | |
| 9,470,609 B2 | 10/2016 | Wimberger-Friedl et al. | |
| 9,500,579 B1 | 11/2016 | Sommer et al. | |
| 9,616,424 B2 | 4/2017 | Lee et al. | |
| 9,624,474 B2 | 4/2017 | Park | |
| 9,625,916 B2 | 4/2017 | Da Fonseca et al. | |
| 9,725,792 B2 | 8/2017 | Ludowise et al. | |
| 9,726,685 B2 | 8/2017 | Lee et al. | |
| 9,737,889 B2 | 8/2017 | Moon et al. | |
| 9,816,987 B2 | 11/2017 | Mehra et al. | |
| 9,829,426 B2 | 11/2017 | Lee et al. | |
| D838,380 S | 1/2019 | Self et al. | |
| 10,568,317 B2 | 2/2020 | Deshamais et al. | |
| D895,136 S | 9/2020 | Whitehead | |
| D895,141 S | 9/2020 | Heron | |
| D897,555 S | 9/2020 | Chou | |
| D915,618 S | 4/2021 | Heron | |
| D936,856 S | 11/2021 | Hawkins et al. | |
| D954,295 S | 6/2022 | Hawkins et al. | |
| D959,019 S | 7/2022 | Hawkins et al. | |
| D960,386 S | 8/2022 | Hawkins et al. | |
| D968,643 S | 11/2022 | Hawkins et al. | |
| 11,638,918 B2 | 5/2023 | Kleinemolen et al. | |
| 2002/0031833 A1 | 3/2002 | Heyneker et al. | |
| 2002/0094147 A1 | 7/2002 | Herron et al. | |
| 2002/0160170 A1* | 10/2002 | Ishige .................... B32B 27/32 428/910 | |
| 2003/0044992 A1 | 3/2003 | Chao et al. | |
| 2003/0064004 A1 | 4/2003 | Agren et al. | |
| 2003/0127609 A1 | 7/2003 | El-Hage | |
| 2003/0161761 A1 | 8/2003 | Williams | |
| 2003/0179378 A1 | 9/2003 | Lafferty | |
| 2004/0009582 A1 | 1/2004 | Sandall | |
| 2004/0057244 A1 | 3/2004 | Amano | |
| 2004/0120856 A1 | 6/2004 | Andersson et al. | |
| 2004/0139455 A1 | 7/2004 | Ute et al. | |
| 2004/0159343 A1 | 8/2004 | Shimbara et al. | |
| 2004/0182795 A1 | 9/2004 | Dorian | |
| 2004/0203136 A1 | 10/2004 | Kellogg et al. | |
| 2005/0003939 A1 | 1/2005 | Womer et al. | |
| 2005/0048575 A1 | 3/2005 | Coassin et al. | |
| 2005/0123445 A1 | 6/2005 | Blecka | |
| 2005/0136545 A1 | 6/2005 | Schmid et al. | |
| 2005/0152807 A1 | 7/2005 | Osterloh et al. | |
| 2005/0229696 A1 | 10/2005 | Takayama | |
| 2005/0272142 A1 | 12/2005 | Horita | |
| 2006/0060781 A1 | 3/2006 | Watanabe et al. | |
| 2006/0160210 A1 | 7/2006 | Mori et al. | |
| 2006/0223166 A1 | 10/2006 | Wilding et al. | |
| 2006/0257992 A1 | 11/2006 | McDevitt et al. | |
| 2007/0010007 A1 | 1/2007 | Aysta et al. | |
| 2007/0166835 A1 | 7/2007 | Bobrow et al. | |
| 2007/0190525 A1 | 8/2007 | Gu et al. | |
| 2007/0298433 A1 | 12/2007 | Sia et al. | |
| 2009/0123958 A1 | 5/2009 | Carmon | |
| 2009/0186357 A1 | 7/2009 | Mauk et al. | |
| 2009/0202848 A1* | 8/2009 | Lu ......................... B29C 55/023 428/411.1 | |
| 2009/0298092 A1 | 12/2009 | Tsai et al. | |
| 2009/0298116 A1 | 12/2009 | Fang | |
| 2010/0055766 A1 | 3/2010 | Hwang et al. | |
| 2010/0081213 A1 | 4/2010 | Lee et al. | |
| 2010/0193686 A1 | 8/2010 | Watanabe et al. | |
| 2011/0038767 A1 | 2/2011 | Baril | |
| 2011/0086778 A1 | 4/2011 | Hermann | |
| 2011/0151435 A1 | 6/2011 | Mehra et al. | |
| 2011/0152202 A1 | 6/2011 | Du Clos | |
| 2011/0180407 A1 | 7/2011 | Tyrrell | |
| 2011/0189701 A1 | 8/2011 | Kim | |
| 2011/0269151 A1 | 11/2011 | Kim | |
| 2011/0312015 A1 | 12/2011 | Velaskar | |
| 2012/0041315 A1 | 2/2012 | Mycek et al. | |
| 2012/0142089 A1 | 6/2012 | Park | |

(56) References Cited

U.S. PATENT DOCUMENTS

| | | |
|---|---|---|
| 2012/0200856 A1 | 8/2012 | Bae |
| 2012/0202673 A1 | 8/2012 | Runyon et al. |
| 2012/0208013 A1* | 8/2012 | Clapper .................. C08L 51/06 |
| | | 428/355 AC |
| 2012/0225446 A1 | 9/2012 | Wimberger-Friedl et al. |
| 2013/0002753 A1 | 1/2013 | Wang et al. |
| 2013/0118581 A1* | 5/2013 | Zhou ....................... B32B 27/08 |
| | | 525/394 |
| 2013/0203634 A1 | 8/2013 | Jovanovich |
| 2013/0224568 A1 | 8/2013 | Fukunago et al. |
| 2013/0273584 A1 | 10/2013 | Masci |
| 2013/0287645 A1 | 10/2013 | Shaikh et al. |
| 2014/0017806 A1 | 1/2014 | Lee |
| 2014/0138260 A1 | 5/2014 | Briman |
| 2014/0185031 A1 | 7/2014 | Zhang et al. |
| 2014/0287524 A1 | 9/2014 | Lee et al. |
| 2014/0319379 A1 | 10/2014 | Manian |
| 2014/0341788 A1 | 11/2014 | Kim et al. |
| 2015/0011020 A1 | 1/2015 | Sundvor |
| 2015/0064774 A1 | 3/2015 | Moon et al. |
| 2015/0079655 A1 | 3/2015 | Laugharn |
| 2015/0090674 A1 | 4/2015 | Lee et al. |
| 2015/0132753 A1 | 5/2015 | Ye et al. |
| 2015/0226652 A1 | 8/2015 | Jayavanth et al. |
| 2015/0293097 A1 | 10/2015 | Godec et al. |
| 2015/0307927 A1 | 10/2015 | Nobile |
| 2015/0321192 A1 | 11/2015 | Lee |
| 2015/0360225 A1 | 12/2015 | Schaff et al. |
| 2015/0362509 A1 | 12/2015 | Woodworth |
| 2016/0038939 A1 | 2/2016 | Min et al. |
| 2016/0038940 A1 | 2/2016 | Babcock |
| 2016/0040213 A1 | 2/2016 | Ludowise et al. |
| 2016/0069919 A1 | 3/2016 | Holmes |
| 2016/0279640 A1 | 9/2016 | Iqbal |
| 2016/0369323 A1 | 12/2016 | Revilla |
| 2017/0023446 A1 | 1/2017 | Rietveld et al. |
| 2017/0067871 A1 | 3/2017 | DeLouise et al. |
| 2017/0080416 A1 | 3/2017 | Panetz |
| 2017/0108494 A1 | 4/2017 | Mehra et al. |
| 2017/0120259 A1 | 5/2017 | Takeuchi |
| 2017/0151559 A1 | 6/2017 | Da Fonseca et al. |
| 2017/0176306 A1 | 6/2017 | Boehm et al. |
| 2017/0176481 A1 | 6/2017 | Accurso |
| 2017/0304826 A1 | 10/2017 | Lee et al. |
| 2017/0354970 A1 | 12/2017 | Reis et al. |
| 2018/0038853 A1 | 2/2018 | Mehra et al. |
| 2018/0154353 A1 | 6/2018 | Glezer et al. |
| 2018/0161772 A1 | 6/2018 | Rammohan |
| 2018/0352806 A1 | 12/2018 | Desharnais et al. |
| 2019/0162670 A1 | 5/2019 | Nose et al. |
| 2019/0300948 A1 | 10/2019 | Cuppens |
| 2019/0314813 A1 | 10/2019 | Doolan |
| 2019/0388596 A1 | 12/2019 | Camisani |
| 2020/0064254 A1 | 2/2020 | Vanderklein et al. |
| 2020/0065959 A1 | 2/2020 | Shartle et al. |
| 2021/0011001 A1 | 1/2021 | Chou et al. |
| 2022/0111385 A1 | 4/2022 | Yang |
| 2022/0266242 A1 | 8/2022 | Samsoonda |
| 2022/0401959 A1 | 12/2022 | Emerson et al. |
| 2023/0132344 A1 | 4/2023 | Lee |
| 2024/0139732 A1 | 5/2024 | Hawkins et al. |

FOREIGN PATENT DOCUMENTS

| | | |
|---|---|---|
| CN | 201298019 Y | 8/2009 |
| CN | 1664543 B | 12/2014 |
| CN | 110531065 A | 12/2019 |
| CN | 211926319 U | 11/2020 |
| DE | 19858443 A1 | 7/2000 |
| EP | 0163063 A2 | 12/1985 |
| EP | 1542010 A1 | 6/2005 |
| EP | 2116305 A1 | 11/2009 |
| EP | 2559991 A1 | 2/2023 |
| GB | 2387642 A | 10/2003 |
| JP | 2000011507 A | 1/2000 |
| JP | 2003100001 A | 4/2003 |
| JP | 2013223441 A | 10/2013 |
| JP | 6016168 B2 | 10/2016 |
| KR | 3020230009592 | 3/2024 |
| WO | 1995033986 A1 | 12/1995 |
| WO | 1999037819 A2 | 7/1999 |
| WO | 2005083423 A2 | 9/2005 |
| WO | 2005119211 A1 | 12/2005 |
| WO | 2009093838 A9 | 7/2009 |
| WO | 2011084697 A2 | 7/2011 |
| WO | 2011093602 A2 | 8/2011 |
| WO | 2011160015 A2 | 12/2011 |
| WO | 2013188574 A2 | 12/2013 |
| WO | 2014010927 A1 | 1/2014 |
| WO | 2014172235 A1 | 10/2014 |
| WO | 2016204638 A2 | 12/2016 |
| WO | 2016204638 A3 | 2/2017 |
| WO | 2017027384 A1 | 2/2017 |
| WO | 2017103029 A1 | 6/2017 |
| WO | 2017165630 A1 | 9/2017 |
| WO | 2017190192 A1 | 11/2017 |
| WO | 2017212031 A1 | 12/2017 |
| WO | 2018005464 A1 | 1/2018 |
| WO | WO 2018/117268 A1 | 6/2018 |
| WO | 2018145005 A1 | 8/2018 |
| WO | 2019202167 A1 | 10/2019 |
| WO | 2020176607 A1 | 9/2020 |
| WO | 2020227643 A1 | 11/2020 |
| WO | 2021236675 A1 | 11/2021 |
| WO | 2021236683 A1 | 11/2021 |
| WO | 2022066741 A3 | 3/2022 |
| WO | 2022076844 A1 | 4/2022 |
| WO | 2022271948 A1 | 12/2022 |
| WO | 2005083423 A3 | 9/2025 |

OTHER PUBLICATIONS

GB: Examination Report mailed in UK Application No. 2305710.2 mailed on Mar. 5, 2024, 2 pgs.

Hawkins, "Rethinking the Clinical Laboratory Test Value Chain: Using New Technologies and New Approaches to Lower Costs, Speed Time-to-Answer, and Contribute to Improved Patient Outcomes," Truvian Slide Deck pp. 1-19 (Apr. 27, 2021).

International Preliminary Report on Patentability for PCT/US2021/051512 mailed Apr. 6, 2023; 7 pages.

International Search Report and Written Opinion for PCT/US2021/051512 mailed Mar. 22, 2022; 11 pages.

Theranos' Elizabeth Holmes Speaks at AACC Meeting. "Theranos Science & Technology: The Miniaturization of Laboratory Testing," American Association for Clinical Chemistry [Video] [Screen captures from video retrieved on the Internet at URL: https://www.mpo-mag.com/contents/view_videos/2016-08-02/theranos-elizabeth-holmes-speaks-at-aacc-meeting/] pp. 1-6 (Aug. 2, 2016).

EP: Extended European Search Report in EP Application No. EP21873336.8 dated Sep. 6, 2024 (8 pages).

GB: Examination Report mailed in UK Application No. 2305710.2 mailed on Sep. 20, 2024 (1 pages).

Bond et al., "Drop-to-Drop Variations in the Cellular Components of Fingerprick Blood," Am. J. Clin. Pathol. 144, pp. 885-894 (2015).

Gale et al, "A review of current Methods in Microfluidic device fabrications and Future commercialization prospects," 3(60): pp. 1-25 (2018).

GB: Office Action issued in GB 2416477.4 dated Feb. 27, 2025 (5 pages).

GB: Office Action issued in GB 2416477.4 dated Jan. 14, 2025 (2 pages).

GB: Office Action issued in GB 2416477.4 dated Mar. 12, 2025 (1 page).

Giroux et al., "Influence of calcium ions in the flow cytometric analysis of human CD8-positive cells," 62A(1):61-64 (Nov. 2004) https://doi.org/10.1002/cyto.a.20084.

Hauke et al, "An Improved Design and Versatile New Lamination Fabrication Method for Twin Electrode Thin Layer Cells Utilizing

(56)          References Cited

OTHER PUBLICATIONS

Track-etch Membranes", Electroanalysis, VHC Publishers, Inc, US, 31(1) (2018): pp. 58-65 XP071939736, ISSN: 1040-0397, DOI: 10.1002/ELAN.201800539.
Kartell Microscope Slide Tray. Online, published date unknown. Retrieved on Jan. 28, 2025 from URL: https://www.dynalon.com/PublicStore/producUKartell-Microscope-Slide-Tray,274,314.aspx.
Kratz et al., "Characterization of four functional biocompatible pressure-sensitive adhesives for rapid prototyping of cell-based lab-on-a-chip and organ-on-a-chip systems," Scientific Reports 9(1), 9287 (2019) https://doi.org/10.1038/s41598-019-45633-x.
Lassale et al., "Elements of the complete blood count associated with cardiovascular disease incidence: Findings from the EPIC-NL cohort study," Scientific Reports (2018) 8:3290.
Li et al., "Out-of-plane microvalves for whole blood separation on lab-on-a-CD;Out-of-plane microvalves for whole blood separation on lab-on-a-CD", Journal of Micromechanics & Microengineering, Institute of Physics Publishing, Bristol, GB, vol. {0} 20, No. {0} 10, Sep. 29, 2010 (Sep. 29, 2010), p. 105024, XP020198610 DOI: 10.1088/0960-1317/20/10/105024.

Olanrewaju et al., "Capillary microfluidics in microchannels: from microfluidic networks to capillaric circuits", Lab on a Chip, 18, pp. 2315-2478 (2018) Available on the Internet at URL: https://pubs.rsc.org/en/content/articlelanding/2018/1c/c81c00458g.
Steigert et al., "Integrated siphon-based metering and sedimentation of whole blood on a hydrophilic lab-on-a-disk", Biomedical Microdevices, Kluwer Academic Publishers, BO,vol. {0} 9, No. {0} 5, May 16, 2007 (May 16, 2007), p. 675-679, XP019524286 DOI: 10.1007/S10544-007-9076-0 external link.
Unico "PowerSpin™ DX Centrifuge" (2015).
Wikipedia "Red Blood Cell," (Retrieved from the Internet on Jun. 11, 2020 at https://en.wikipedia.org/wiki/Red_blood_cell) (1987), p. 4.
Wörner et al., "Platelet aggregation and the release induced by inophores for divalent cations," Thrombosis Research 6(4):295-305 (1975).
Zhang et al., "A simple statistical parameter for use in evaluation and validation of high throughput screening assays" Journal of Biomolecular Screening 4:67-73 (1999).

* cited by examiner

10

11

12 {

13

14

15

20

21

22

23

METHODS FOR BONDING PLASTICS AND COMPONENTS MADE BY THE SAME

CROSS-REFERENCE TO RELATED APPLICATION(S)

This application is a 35 USC § 371 National Stage application of International Application No. PCT/US2021/051512 filed Sep. 22, 2021, now pending; which claims the benefit under 35 USC § 119 (e) to U.S. Application Ser. No. 63/081,588 filed Sep. 22, 2020. The disclosure of each of the prior applications is considered part of and is incorporated by reference in the disclosure of this application.

BACKGROUND OF THE INVENTION

Field of the Invention

The present disclosure relates generally to bonding of plastics, and more particularly to components having thermally dissimilar plastics and methods of bonding thermally dissimilar plastics, especially plastics having a difference in melting temperatures.

Background Information

Thermally dissimilar plastics are difficult to bond to one another. Differences in melting points prevent the thermally dissimilar plastics from reliably bonding together, especially through thermal bonding processes like laser welding, thermal fusion bonding, and ultrasonic welding. Some materials, such as cyclic olefin polymer (COP) can become exceedingly brittle from thermal processing or solvent bonding, and as a result, expensive and time-consuming annealing processes need to be performed to make such materials viable for use. Therefore, there is a need for an inexpensive and practical component having thermally dissimilar plastics, as well as a method for bonding thermally dissimilar plastics together to form such a component.

SUMMARY OF THE INVENTION

A component having thermally dissimilar plastics is described herein. In some embodiments, the component includes: a substrate having a melting temperature in a first temperature range; and a laminate bonded to the substrate. The laminate includes: a bonding film having a melting temperature in the first temperature range; an adhesive layer; and an optical film having a melting temperature in a second temperature range. In some embodiments, a difference between the melting temperature of the substrate and the melting temperature of the optical film is about 50 to 250° F.

In some embodiments, the first temperature range is about 140 to 220° F.

In some embodiments, the second temperature range is about 250 to 450° F.

In some embodiments, the difference between the melting temperature of the substrate and the melting temperature of the optical film is about 100 to 200° F.

In some embodiments, the substrate includes a polycarbonate.

In some embodiments, the bonding film includes a polycarbonate.

In some embodiments, the adhesive layer is a pressure sensitive adhesive, transfer adhesive, or other applied adhesive layer.

In some embodiments, the optical film includes a cyclic olefin polymer.

In some embodiments, the bonding film is in direct contact with the substrate.

In some embodiments, the substrate and the bonding film have a difference between melting temperatures of about 30° F. or less.

A method of bonding plastics is described herein. In some embodiments, the method of bonding plastics, includes: providing a substrate having a melting temperature in a first temperature range; providing a bonding film having a melting temperature in the first temperature range; providing an adhesive layer; providing an optical film having a melting temperature in a second temperature range; laminating the bonding film, the adhesive layer, and optical film together; and bonding the laminate to the substrate, wherein a difference between the melting temperature of the substrate and the melting temperature of the optical film is about 50 to 250° F.

In some embodiments, the first temperature range is about 140 to 220° F.

In some embodiments, the second temperature range is about 250 to 450° F.

In some embodiments, the difference between the melting temperature of the substrate and the melting temperature of the optical film is about 100 to 200° F.

In some embodiments, the substrate includes a polycarbonate.

In some embodiments, the bonding film includes a polycarbonate.

In some embodiments, the adhesive layer is a pressure sensitive adhesive layer, transfer adhesive layer, or other applied adhesive layer.

In some embodiments, the optical film includes a cyclic olefin polymer.

In some embodiments, the bonding the laminate to the substrate includes bonding the bonding film in direct contact with the substrate.

In some embodiments, the bonding the laminate to the substrate includes thermal bonding the laminate to the substrate.

In some embodiments, the bonding the laminate to the substrate includes laser welding the laminate to the substrate.

Also described herein is a component manufactured from the method described herein.

Another component is also described herein. In some embodiments, the component includes: a substrate having a melting temperature in a first temperature range; an optical film having a melting temperature in a second temperature range; and a thermal matching layer between the substrate and the optical film, the thermal matching layer having a melting temperature in the first temperature range, the second temperature range or between the first temperature range and the second temperature range, wherein a difference between the melting temperature of the substrate and the melting temperature of the optical film is about 50 to 250° F.

In some embodiments, the first temperature range is about 140 to 220° F.

In some embodiments, the second temperature range is about 250 to 450° F.

In some embodiments, the difference between the melting temperature of the substrate and the melting temperature of the optical film is about 100 to 200° F.

In some embodiments, the substrate includes a polycarbonate.

In some embodiments, the optical film includes a cyclic olefin polymer.

In some embodiments, the thermal matching layer includes at least one or both of acrylic and urethane.

In some embodiments, the thermal matching layer includes parylene.

In some embodiments, the thermal matching layer has a melting temperature in the second temperature range.

In some embodiments, the thermal matching layer has a melting temperature in the first temperature range.

Another method of bonding plastics is also described herein. In some embodiments, the method of bonding plastics, includes: providing a substrate having a melting temperature in a first temperature range; providing an optical film having a melting temperature in a second temperature range; coating the substrate with a thermal matching layer having a melting temperature in the second temperature range or between the first temperature range and the second temperature range, or coating the optical film with a thermal matching layer having a melting temperature in the first temperature range or between the first temperature range and the second temperature range; and bonding the thermal matching layer to the substrate or the optical film that is uncoated with the thermal matching layer, wherein a difference between the melting temperature of the substrate and the melting temperature of the optical film is about 50 to 250° F.

In some embodiments, the first temperature range is about 140 to 220° F.

In some embodiments, the second temperature range is about 250 to 450° F.

In some embodiments, the difference between the melting temperature of the substrate and the melting temperature of the optical film is about 100 to 200° F.

In some embodiments, the substrate includes a polycarbonate.

In some embodiments, the optical film includes a cyclic olefin polymer.

In some embodiments, the thermal matching layer includes at least one of acrylic and urethane.

In some embodiments, the thermal matching layer includes parylene.

In some embodiments, bonding the thermal matching layer to the substrate or the optical film that is uncoated with the thermal matching layer includes thermal bonding the thermal matching layer to the substrate or the optical film that is uncoated with the thermal matching layer.

In some embodiments, bonding the thermal matching layer to the substrate or the optical film that is uncoated with the thermal matching layer includes laser welding the thermal matching layer to the substrate or the optical film that is uncoated with the thermal matching layer.

In some embodiments, the method includes coating the substrate with a thermal matching layer having a melting temperature in the second temperature range or between the first temperature range and the second temperature range.

In some embodiments, the method includes coating the optical film with a thermal matching layer having a melting temperature in the first temperature range or between the first temperature range and the second temperature range.

Also described herein is a component manufactured from the method described herein.

DETAILED DESCRIPTION

Figure 1:
FIG. 1 is a cross-sectional view of a component produced by a method of the present disclosure.
Figure 1:
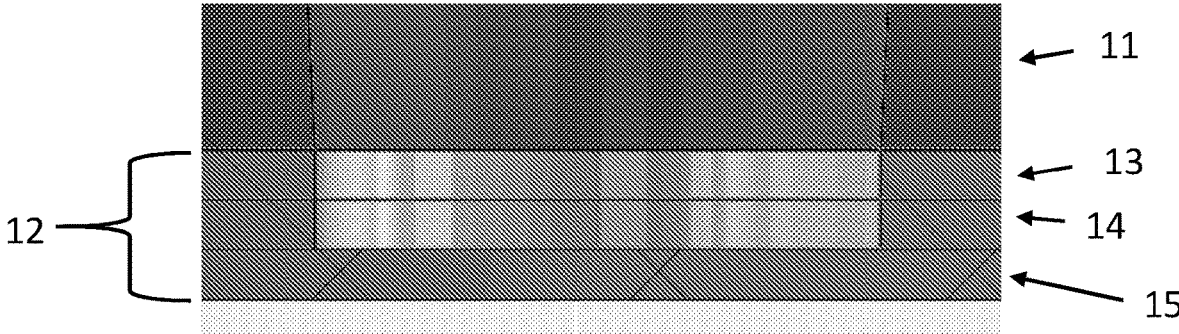

The disclosure provides a component having thermally dissimilar plastics. In some embodiments, as shown in FIG. 1, the component 10 includes: a substrate 11, such as a polycarbonate, having a melting temperature in a first temperature range; and a laminate 12 bonded to the substrate 11. The laminate 12 includes: a bonding film 13, such as a polycarbonate, having a melting temperature in the first temperature range; an adhesive layer 14, such as a pressure sensitive adhesive; and an optical film 15, such as COP, having a melting temperature in a second temperature range. In some embodiments, a difference between the melting temperature of the substrate and the melting temperature of the optical film is about 50 to 250° F.

In some embodiments, the bonding film 13 and the adhesive layer 14 have cut outs so that optically, only the optical film 15 would be in an optical path of an analytical instrument. In some embodiments, the bonding film 13 can cover the entire surface of the optical film 15 or it may only be applied in regions that will form the bond with the substrate 11.

A method of bonding thermally dissimilar plastics is described herein. In some embodiments, the method of bonding plastics, includes: providing a substrate having a melting temperature in a first temperature range; providing a bonding film having a melting temperature in the first temperature range; providing an adhesive layer; providing an optical film having a melting temperature in a second temperature range; laminating the bonding film, the adhesive layer, and optical film together; and bonding the laminate to the substrate, wherein a difference between the melting temperature of the substrate and the melting temperature of the optical film is about 50 to 250° F.

In some embodiments, the method produces a component 10 having thermally dissimilar plastics as described herein. The following paragraphs describe the component 10 having thermally dissimilar plastics and the method of bonding thermally dissimilar plastics in conjunction.

In some embodiments, the substrate 11 has a melting temperature within a first temperature range. In some embodiments, the substrate 11 has a melting temperature within a first temperature range of about 140 to 220° F. In some embodiments, the first temperature range is about 250 to 450° F.

In some embodiments, the bonding film 13 has a melting temperature within the same first temperature range. In some embodiments, the bonding film 13 has a melting temperature within a first temperature range of about 140 to 220° F. In some embodiments, the first temperature range is about 250 to 450° F.

Without being bound to any particular theory, the substrate 11 and the bonding film 13 have melting temperatures that are similar to allow for reliably joining and bonding of the substrate 11 and the bonding film 13. Differences in melting points prevent the substrate 11 and the bonding film 13 from reliably bonding together, especially through thermal bonding processes like laser welding, thermal fusion bonding, and ultrasonic welding.

In some embodiments, the substrate 11 and the bonding film 13 have a difference between melting temperatures of about 80° F. or less. In some embodiments, the substrate 11 and the bonding film 13 have a difference between melting temperatures of about 70° F. or less. In some embodiments, the substrate 11 and the bonding film 13 have a difference between melting temperatures of about 60° F. or less. In some embodiments, the substrate 11 and the bonding film 13 have a difference between melting temperatures of about 50° F. or less. In some embodiments, the substrate 11 and the bonding film 13 have a difference between melting temperatures of about 40° F. or less. In some embodiments, the substrate 11 and the bonding film 13 have a difference between melting temperatures of about 30° F. or less. In some embodiments, the substrate 11 and the bonding film 13 have a difference between melting temperatures of about 20° F. or less. In some embodiments, the substrate 11 and the bonding film 13 have a difference between melting temperatures of about 10° F. or less. In some embodiments, the substrate 11 and the bonding film 13 have a difference between melting temperatures of about 5° F. or less.

The substrate 11 can be made from any suitable plastic not inconsistent with the objectives of the present disclosure. In some embodiments, the substrate 11 is composed of polypropylene, polyvinylbutyrale, polyamide, polyamide 12, polyarylate, parylene, polyether ether ketone, polybenzimidazole, polyamide-imide, thermoplastic polyimide, liquid crystal polymer (such as Kevlar™, Vectran™ and Zenite™), polyphthalamide, polycarbonate, polystyrene, polysulfone, polyimide, polyphenolsulfone, polyetherimide, polyether sulfone, polyarylethersulfone, poly(bisphenol-A sulfone), polyarylene sulfone, polyethylene, polyester, vinyl, poly(vinylchloride) (PVC), polyurethane, polyvinyldiene chloride, cyclic olefin polymer (COP), cyclic olefin copolymer (COC), polycarbonate-polyethylene terephthalate-blends, polycarbonatepolybutylene terephthalate-blends, polycarbonate-acrylnitrile/styrene/acrylnitrile-copolymer-blends, polycarbonate-acrylnitrile/butadiene/styrene-copolymer-blends, polymethylmethacrylate-acrylnitrile/butadiene/styrene-copolymer-blends (MABS), polyethylene terephthalate, polymethylmethacrylate-polyvinylidenedifluoride-blends, acrylnitrile/butadiene/styrene-copolymere (ABS), styrene/acrylnitrile-copolymere (SAN), Victrex™ HTA, and polyphenylenesulfone, or any combination thereof. In one embodiment, the substrate 11 includes a polycarbonate.

The bonding film 13 can be made from any suitable plastic not inconsistent with the objectives of the present disclosure. In some embodiments, the bonding film 13 is composed of polypropylene, polyvinylbutyrale, polyamide, polyamide 12, polyarylate, parylene, polyether ether ketone, polybenzimidazole, polyamide-imide, thermoplastic polyimide, liquid crystal polymer (such as Kevlar™, Vectran™ and Zenite™), polyphthalamide, polycarbonate, polystyrene, polysulfone, polyimide, polyphenolsulfone, polyetherimide, polyether sulfone, polyarylethersulfone, poly(bisphenol-A sulfone), polyarylene sulfone, polyethylene, polyester, vinyl, poly(vinylchloride) (PVC), polyurethane, polyvinyldiene chloride, cyclic olefin polymer (COP), cyclic olefin copolymer (COC), polycarbonate-polyethylene terephthalate-blends, polycarbonatepolybutylene terephthalate-blends, polycarbonate-acrylnitrile/styrene/acrylnitrile-copolymer-blends, polycarbonate-acrylnitrile/butadiene/styrene-copolymer-blends, polymethylmethacrylate-acrylnitrile/butadiene/styrene-copolymer-blends (MABS), polyethylene terephthalate, polybutylene terephthalate, polymethylmethacrylate, polybutylacrylate, polymethylmethacrylate-polyvinylidenedifluoride-blends, acrylnitrile/butadiene/styrene-copolymere (ABS), styrene/acrylnitrile-copolymere (SAN), polyphenylenesulfone, Victrex™ HTA, or any combination thereof. In one embodiment, the bonding film 13 includes a polycarbonate.

In some embodiments, the substrate 11 and the bonding film 13 both comprise a polycarbonate. Without being bound to any particular theory, the substrate 11 and the bonding film 13 both including polycarbonate allow for melting temperatures that are similar, thereby reliably joining and bonding the substrate 11 and the bonding film 13 together. In other embodiments, the substrate 11 and the bonding film 13 can be composed of other suitable plastic materials having melting temperatures that are similar to one another as outlined in the paragraphs above.

The thickness of the bonding film 13 is not particularly limited. However, in some embodiments, the thickness is about 10 μm to about 500 including for example, about 50 μm to 250 μm, and about 150 μm to 250 μm.

In some embodiments, the optical film 15 has a melting temperature within a second temperature range. In some embodiments, the optical film 15 has a melting temperature within a second temperature range of about 250 to 450° F. In some embodiments, the second temperature range is about 140 to 220° F.

The optical film 15 can be made from any suitable plastic not inconsistent with the objectives of the present disclosure. In some embodiments, the optical film 15 is composed of polypropylene, polyvinylbutyrale, polyamide, polyamide 12, polyarylate, parylene, polyether ether ketone, polybenzimidazole, polyamide-imide, thermoplastic polyimide, liquid crystal polymer (such as Kevlar™, Vectran™ and Zenite™), polyphthalamide, polycarbonate, polystyrene, polysulfone, polyimide, polyphenolsulfone, polyetherimide, polyether sulfone, polyarylethersulfone, poly(bisphenol-A sulfone), polyarylene sulfone, polyethylene, polyester, vinyl, poly(vinylchloride) (PVC), polyurethane, polyvinyldiene chloride, cyclic olefin polymer (COP), cyclic olefin copolymer (COC), polycarbonate-polyethylene terephthalate-blends, polycarbonatepolybutylene terephthalate-blends, polycarbonate-acrylnitrile/styrene/acrylnitrile-copolymer-blends, polycarbonate-acrylnitrile/butadiene/styrene-copolymer-blends, polymethylmethacrylate-acrylnitrile/butadiene/styrene-copolymer-blends (MABS), polyethylene terephthalate, polymethylmethacrylate-polyvinylidenedifluoride-blends, acrylnitrile/butadiene/styrene-copolymere (ABS), styrene/acrylnitrile-copolymere (SAN), and polyphenylenesulfone, or any combination thereof. In some embodiments, the optical film 15 is composed of cyclic olefin polymer, polyimide, polyphenolsulfone, polyetherimide, polysulfone, polyether sulfone, polyarylethersulfone, poly(bisphenol-A sulfone), polyarylene sulfone, polyamide 12, polyarylate, parylene, polyether ether ketone, polybenzimidazole, polyamide-imide, thermoplastic polyimide, liquid crystal polymer (such as Kevlar™, Vectran™ and Zenite™) polyphthalamide, Victrex™ HTA, or any combination thereof. In one embodiment, the optical film 15 includes a cyclic olefin polymer.

The thickness of the optical film 15 is not particularly limited. However, in some embodiments, the thickness is about 10 μm to about 500 μm, including for example, about 50 μm to 250 μm, and about 150 μm to 250 μm.

In some embodiments, a difference between the melting temperature of the substrate 11 and the melting temperature of the optical film 15 is about 50 to 250° F. In some embodiments, the difference between the melting temperature of the substrate 11 and the melting temperature of the optical film 15 is about 100 to 200° F. In some embodiments, the difference between the melting temperature of the substrate 11 and the melting temperature of the optical film 15 is about 125 to 175° F. In some embodiments, the difference between the melting temperature of the substrate 11 and the melting temperature of the optical film 15 is about 140 to 160° F. In some embodiments, the difference between the melting temperature of the substrate 11 and the melting temperature of the optical film 15 is about 150° F.

In some embodiments, the adhesive layer 14 is a pressure sensitive adhesive layer 14. In other embodiments, the adhesive layer 14 can be formed from a transfer adhesive, liquid adhesive, or a solvent bond, i.e., a transfer adhesive layer, a liquid adhesive layer, or a solvent bond layer. The pressure sensitive adhesive that is used to form the adhesive layer 14 is not especially limited. Examples include a general pressure sensitive adhesive such as an acrylic pressure-sensitive adhesive, silicone pressure-sensitive adhesive, and a rubber-based pressure sensitive adhesive. For some embodiments, as the pressure-sensitive adhesive, an acrylic pressure sensitive adhesive having an acrylic polymer as a base polymer is utilized.

Examples of the acrylic polymer include acrylic polymers using, as a monomer component, one or more types of (meth)acrylic acid alkyl esters (for example, a straight chain or branched chain alkyl ester having 1 to 30 carbon atoms, and particularly 4 to 18 carbon atoms in the alkyl group such as methylester, ethylester, propylester, isopropylester, butylester, isobutylester, sec-butylester, t-butylester, pentylester, isopentylester, hexylester, heptylester, octylester, 2-ethylhexylester, isooctylester, nonylester, decylester, isodecylester, undecylester, dodecylester, tridecylester, tetradecylester, hexadecylester, octadecylester, and eicosylester) and (meth)acrylic acid cycloalkyl esters (for example, cyclopentylester, cyclohexylester, etc.). The (meth)acrylic acid ester means an acrylic acid ester and/or a methacrylic acid ester and has the very same meaning as (meth) in the present disclosure.

The acrylic polymer may optionally contain a unit corresponding to a different monomer component copolymerizable with the above-mentioned alkyl ester of (meth)acrylic acid or cycloalkyl ester thereof in order to improve the cohesive force, heat resistance or some other property of the polymer. Examples of such a monomer component include carboxyl-containing monomers such as acrylic acid, methacrylic acid, carboxyethyl (meth)acrylate, carboxypentyl (meth)acrylate, itaconic acid, maleic acid, fumaric acid, and crotonic acid; acid anhydride monomers such as maleic anhydride, and itaconic anhydride; hydroxyl-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxylmethylcyclohexyl)methyl (meth)acrylate; sulfonic acid group containing monomers such as styrenesulfonic acid, allylsulfonic acid, 2-(meth) acrylamide-2-methylpropanesulfonic acid, (meth)acrylamidepropanesulfonic acid, sulfopropyl (meth)acrylate, and (meth)acryloyloxynaphthalenesulfonic acid; phosphoric acid group containing monomers such as 2-hydroxyethylacryloyl phosphate; acrylamide; and acrylonitrile. These copolymerizable monomer components may be used alone or in combination of two or more thereof. The amount of the copolymerizable monomer(s) to be used is about 40% or less by weight of all the monomer components.

For crosslinking, the acrylic polymer can also contain multifunctional monomers if necessary, as the copolymerizable monomer component. Such multifunctional monomers include hexane diol di(meth)acrylate, (poly)ethylene glycol di(meth)acrylate, (poly)propylene glycol di(meth) acrylate, neopentyl glycol di(meth)acrylate, pentaerythritol di(meth)acrylate, trimethylol propane tri(meth)acrylate, pentaerythritol tri(meth)acrylate, dipentaerythritol hexa(meth)acrylate, epoxy (meth)acrylate, polyester (meth)acrylate, urethane (meth)acrylate etc. These multifunctional monomers can also be used as a mixture of one or more thereof. From the viewpoint of adhesiveness, the use amount of the multifunctional monomer is about 30 wt % or less based on the whole monomer components.

The thickness of the adhesive layer 14 is not particularly limited. However, in some embodiments, the thickness is about 10 μm to about 500 μm including for example, about 50 μm to 250 μm, and about 50 μm to 200 μm.

The method further includes laminating the bonding film 13, the adhesive layer 14, and optical film 15 together. In some embodiments, the bonding film 13, the adhesive layer 14, and optical film 15 are laminated sequentially as listed. The process for laminating the bonding film 13, the adhesive layer 14, and optical film 15 together is not especially limited. Any laminating process not inconsistent with the objectives of the present disclosure can be used.

The method further includes bonding the laminate 12 to the substrate. In some embodiments, bonding the laminate 12 to the substrate 11 includes bonding the bonding film 13 in direct contact with the substrate. In some embodiments, the bonding the laminate 12 to the substrate 11 includes thermal bonding the laminate 12 to the substrate. Any thermal bonding process not inconsistent with the objectives of the present disclosure can be used. Non-limiting examples include laser welding, thermal fusion bonding, and ultrasonic welding. In some embodiments, the bonding the laminate 12 to the substrate 11 includes laser welding the laminate 12 to the substrate.

Without being bound to any particular theory, differences in melting points, for example, about 50 to 250° F., prevent the substrate 11 and the optical film 15 from reliably bonding together, especially bonding the substrate 11 and the optical film 15 through thermal bonding processes. By laminating the optical film 15 to a bonding film 13 and an adhesive layer 14 and bonding the laminate 12 to the substrate, the optical film 15 can be reliably joined together with the substrate 11 because the bonding film 13 and the substrate 11 have similar melting temperatures.

Also described herein is a component manufactured from the method described herein. As shown in FIG. 1, the component 10 includes a substrate 11 and a laminate 12. The laminate 12 includes a bonding film 13, an adhesive layer 14, and an optical film 15. In some embodiments, the bonding film 13 and the adhesive layer 14 have cut outs so that optically, only the optical film 15 would be in an optical path of an analytical instrument. In some embodiments, the bonding film 13 can cover the entire surface of the optical film 15 or it may only be applied in regions that will form the bond with the substrate 11.

The bonding film 13 is thermally bonded to the substrate 11. In some embodiments, the bonding film 13 is thermally bonded to the substrate 11 using laser welding.

Figure 2:
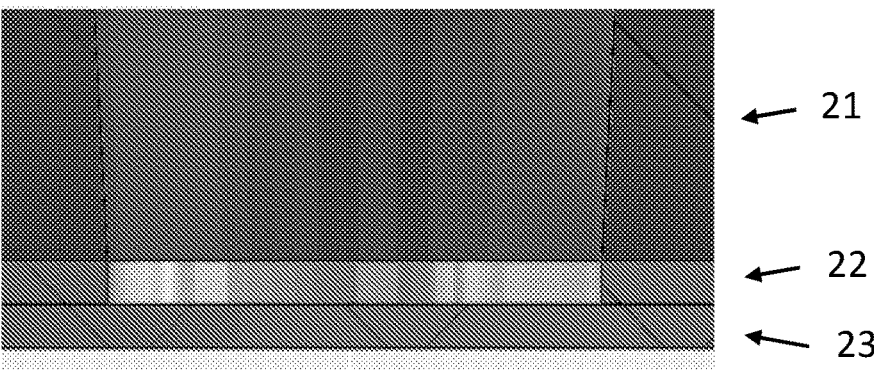
FIG. 2 is a cross-sectional view of a component produced by a method of the present disclosure.

Another component is described herein. In some embodiments, as shown in FIG. 2, the component 20 includes: a substrate 21, such as a polycarbonate, having a melting temperature in a first temperature range; an optical film 23, such as COP, having a melting temperature in a second temperature range; and a thermal matching layer 22 between the substrate and the optical film having a melting temperature in the first temperature range the second temperature range, or between the first temperature range and the second temperature range, wherein a difference between the melting temperature of the substrate 21 and the melting temperature of the optical film 23 is about 50 to 250° F. In some embodiments, the thermal matching layer 22 has cut outs so that optically only the optical film 23 would be seen by analytical instruments.

Another method of bonding plastics is described herein. In some embodiments, the method of bonding plastics, includes: providing a substrate 21 having a melting temperature in a first temperature range; providing an optical film 23 having a melting temperature in a second temperature range; coating the substrate 21 with a thermal matching layer 22 having a melting temperature in the second temperature range, or coating the optical film 23 with a thermal matching layer 22 having a melting temperature in the first temperature range; and bonding the thermal matching layer 22 to the substrate 21 or the optical film 23 that is uncoated with the thermal matching layer 22, wherein a difference between the melting temperature of the substrate 21 and the melting temperature of the optical film 23 is about 50 to 250° F.

In some embodiments, the method can produce a component 20 having thermally dissimilar plastics as described herein. The following paragraphs describe the component 20 having thermally dissimilar plastics and the method of bonding thermally dissimilar plastics in conjunction.

The substrate 21 has a melting temperature within a first temperature range. In some embodiments, the substrate 21 has a melting temperature within a first temperature range of about 140 to 220° F. In some embodiments, the first temperature range is about 250 to 450° F.

The substrate 21 can be made from any suitable plastic not inconsistent with the objectives of the present disclosure. In some embodiments, the substrate 21 is composed of polypropylene, polyvinylbutyrale, polyamide, polyamide 12, polyarylate, parylene, polyether ether ketone, polybenzimidazole, polyamide-imide, thermoplastic polyimide, liquid crystal polymer (such as Kevlar™, Vectran™ and Zenite™), polyphthalamide, polycarbonate, polystyrene, polysulfone, polyimide, polyphenolsulfone, polyetherimide, polyether sulfone, polyarylethersulfone, poly(bisphenol-A sulfone), polyarylene sulfone, polyethylene, polyester, vinyl, poly(vinylchloride) (PVC), polyurethane, polyvinyldiene chloride, cyclic olefin polymer (COP), cyclic olefin copolymer (COC), polycarbonate-polyethylene terephthalate-blends, polycarbonatepolybutylene terephthalate-blends, polycarbonate-acrylnitrile/styrene/acrylnitrile-copolymer-blends, polycarbonate-acrylnitrile/butadiene/styrene-copolymer-blends, polymethylmethacrylate-acrylnitrile/butadiene/styrene-copolymer-blends (MABS), polyethylene terephthalate, polybutylene terephthalate, polymethylmethacrylate, polybutylacrylate, polymethylmethacrylate-polyvinylidenedifluoride-blends, acrylnitrile/butadiene/styrene-copolymere (ABS), styrene/acrylnitrile-copolymere (SAN), Victrex™ HTA, and polyphenylenesulfone, or any combination thereof. In one embodiment, the substrate 21 includes a polycarbonate.

The optical film 23 has a melting temperature within a second temperature range. In some embodiments, the optical film 23 has a melting temperature within a second temperature range of about 250 to 450° F. In some embodiments, the second temperature range is about 140 to 220° F.

The optical film 23 can be made from any suitable plastic not inconsistent with the objectives of the present disclosure. In some embodiments, the optical film 23 is composed of polypropylene, polyvinylbutyrale, polyamide, polyamide 12, polyarylate, parylene, polyether ether ketone, polybenzimidazole, polyamide-imide, thermoplastic polyimide, liquid crystal polymer (such as Kevlar™, Vectran™ and Zenite™), polyphthalamide, polycarbonate, polystyrene, polysulfone, polyimide, polyphenolsulfone, polyetherimide, polyether sulfone, polyarylethersulfone, poly(bisphenol-A sulfone), polyarylene sulfone, polyethylene, polyester, vinyl, poly(vinylchloride) (PVC), polyurethane, polyvinyldiene chloride, cyclic olefin polymer (COP), cyclic olefin copolymer (COC), polycarbonate-polyethylene terephthalate-blends, polycarbonatepolybutylene terephthalate-blends, polycarbonate-acrylnitrile/styrene/acrylnitrile-copolymer-blends, polycarbonate-acrylnitrile/butadiene/styrene-copolymer-blends, polymethylmethacrylate-acrylnitrile/butadiene/styrene-copolymer-blends (MABS), polyethylene terephthalate, polybutylene terephthalate, polymethylmethacrylate, polybutylacrylate, polymethylmethacrylate-polyvinylidenedifluoride-blends, acrylnitrile/butadiene/styrene-copolymere (ABS), styrene/acrylnitrile-copolymere (SAN), Victrex™ HTA, and polyphenylenesulfone, or any combination thereof. In some embodiments, the optical film 23 is composed of cyclic olefin polymer, polyimide, polyphenolsulfone, polyetherimide, polysulfone, polyether sulfone, polyarylethersulfone, poly(bisphenol-A sulfone), polyarylene sulfone, polyamide 12, polyarylate, parylene, polyether ether ketone, polybenzimidazole, polyamide-imide, thermoplastic polyimide, liquid crystal polymer (such as Kevlar™, Vectran™ and Zenite™), polyphthalamide, Victrex™ HTA, or any combination thereof. In one embodiment, the bonding film 23 includes a cyclic olefin polymer.

The thickness of the optical film 23 is not particularly limited. However, some in embodiments, the thickness is about 10 μm to about 500 μm including for example, about 50 μm to 250 μm, and about 150 μm to 250 μm.

In some embodiments, a difference between the melting temperature of the substrate 21 and the melting temperature of the optical film 23 is about 50 to 250° F. In some embodiments, the difference between the melting temperature of the substrate 21 and the melting temperature of the optical film 23 is about 100 to 200° F. In some embodiments, the difference between the melting temperature of the substrate 21 and the melting temperature of the optical film 23 is about 125 to 175° F. In some embodiments, the difference between the melting temperature of the substrate 21 and the melting temperature of the optical film 23 is about 140 to 160° F. In some embodiments, the difference between the melting temperature of the substrate 21 and the melting temperature of the optical film 23 is about 150° F.

The method further includes coating the substrate 21 with a thermal matching layer 22 having a melting temperature in the second temperature range, or coating the optical film 23 with a thermal matching layer 22 having a melting temperature in the first temperature range. The thermal matching layer 22 can be made from any suitable polymer not inconsistent with the objectives of the present disclosure. That is, the thermal matching layer 22 can be made from any suitable polymer having a melting temperature in the second temperature range when coated on the substrate, or the thermal matching layer 22 can be made from any suitable polymer having a melting temperature in the first temperature range when coated on the optical film. In some embodiments, the thermal matching layer 22 includes at least one of acrylic and urethane. In some embodiments, the thermal matching layer 22 includes parylene.

In some embodiments, the substrate 21 is coated with the thermal matching layer 22 having a melting temperature in the second temperature range. In some embodiments, the thermal matching layer 22 and the optical film 23 have a difference between melting temperatures of about 80° F. or less. In some embodiments, the substrate 21 and the optical film 23 have a difference between melting temperatures of about 70° F. or less. In some embodiments, the substrate 21 and the optical film 23 have a difference between melting temperatures of about 60° F. or less. In some embodiments, the substrate 21 and the optical film 23 have a difference between melting temperatures of about 50° F. or less. In some embodiments, the substrate 21 and the optical film 23 have a difference between melting temperatures of about 40° F. or less. In some embodiments, the substrate 21 and the optical film 23 have a difference between melting temperatures of about 30° F. or less. In some embodiments, the substrate 21 and the optical film 23 have a difference between melting temperatures of about 20° F. or less. In some embodiments, the substrate 21 and the optical film 23 have a difference between melting temperatures of about 10° F. or less. In some embodiments, the substrate 21 and the optical film 23 have a difference between melting temperatures of about 5° F. or less.

In some embodiments, the optical film 23 is coated with the thermal matching layer 22 having a melting temperature in the first temperature range. In some embodiments, the thermal matching layer 22 and the substrate 21 have a difference between melting temperatures of about 80° F. or less. In some embodiments, the thermal matching layer 22 and the substrate 21 have a difference between melting temperatures of about 70° F. or less. In some embodiments, the thermal matching layer 22 and the substrate 21 have a difference between melting temperatures of about 60° F. or less. In some embodiments, the thermal matching layer 22 and the substrate 21 have a difference between melting temperatures of about 50° F. or less. In some embodiments, the thermal matching layer 22 and the substrate 21 have a difference between melting temperatures of about 40° F. or less. In some embodiments, the thermal matching layer 22 and the substrate 21 have a difference between melting temperatures of about 30° F. or less. In some embodiments, the thermal matching layer 22 and the substrate 21 have a difference between melting temperatures of about 20° F. or less. In some embodiments, the thermal matching layer 22 and the substrate 21 have a difference between melting temperatures of about 10° F. or less. In some embodiments, the thermal matching layer 22 and the substrate 21 have a difference between melting temperatures of about 5° F. or less.

Without being bound to any particular theory, differences in melting points, for example, about 50 to 250° F., prevent the substrate 21 and the optical film 23 from reliably bonding together, especially bonding the substrate 21 and the optical film 23 through thermal bonding processes. By coating the substrate 21 with a thermal matching layer 22 having a melting temperature in the second temperature range, or coating the optical film 23 with a thermal matching layer 22 having a melting temperature in the first temperature range, the optical film 23 can be reliably joined together with the substrate 21 because the thermal matching layer 22 has a similar melting temperature as the substrate 21 or the optical film 23 to which it is to be bonded.

The thickness of the thermal matching layer 22 is not particularly limited. However, in some embodiments, the thickness is about 10 μm to about 500 μm including for example, about 50 μm to 250 μm, and about 50 μm to 200 μm.

Any coating application process not inconsistent with the objectives of the present disclosure can be used. Non-limiting examples include, but are not limited to, pad printing, vapor deposition, spray coating, direct printing, or any other method for introducing a thin uniform layer of thermal matching coating.

The bond between the thermal matching layer 22 and the coated surface can be any bond not inconsistent with the objectives of the present disclosure. For some embodiments, the bond between the thermal matching layer 22 and the coated surface can be a mechanical or chemical bond.

The method further includes bonding the thermal matching layer 22 to the substrate 21 or the optical film 23 that is uncoated with the thermal matching layer 22. In some embodiments, the thermal matching layer 22 is bonded to the substrate 21 as the thermal matching layer 22 is coated on the optical film. In some embodiments, the thermal matching layer 22 is bonded to the optical film 23 as the thermal matching layer 22 is coated on the substrate.

In some embodiments, bonding the thermal matching layer 22 to the substrate 21 or the optical film 23 that is uncoated with the thermal matching layer 22 includes thermal bonding the thermal matching layer 22 to the substrate 21 or the optical film 23 that is uncoated with the thermal matching layer 22. Any thermal bonding process not inconsistent with the objectives of the present disclosure can be used. Non-limiting examples include laser welding, thermal fusion bonding, and ultrasonic welding. In some embodiments, bonding the thermal matching layer 22 to the substrate 21 or the optical film 23 that is uncoated with the thermal matching layer 22 includes laser welding the thermal matching layer 22 to the substrate 21 or the optical film 23 that is uncoated with the thermal matching layer 22.

Also described herein is a component manufactured from the method described herein. As shown in FIG. 2, the component 20 includes a substrate 21 a thermal matching layer 22, and an optical film 23. In some embodiments, the thermal matching layer 22 has cut outs so that optically only the optical film 23 would be in an optical path of an analytical instrument.

The thermal matching layer 22 is thermally bonded to the substrate 21. In some embodiments, the thermal matching layer 22 is thermally bonded to the substrate 21 using laser welding.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, while the current subject matter is described as being used in connection with optical analytical devices and systems, it will be appreciated that the devices, components and systems described herein can be used with other types of analytical devices and systems, or in any technological field that utilizes bonded plastics. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

Although the invention has been described with reference to the above examples, it will be understood that modifications and variations are encompassed within the spirit and scope of the invention.

What is claimed is:

1. A component comprising:
   a substrate having a melting temperature in a first temperature range; and
   a laminate bonded to the substrate, the laminate comprising:
   a bonding film having a melting temperature in the first temperature range;
   an adhesive layer; and
   an optical film having a melting temperature in a second temperature range,
   wherein the bonding film and the adhesive layer have cut outs so that only the optical film is in an optical path of an analytical instrument wherein a difference between the melting temperature of the substrate and the melting temperature of the optical film is about 50 to 250° F.

2. The component according to claim 1, wherein the first temperature range is about 140 to 220° F.

3. The component according to claim 1, wherein the second temperature range is about 250 to 450° F.

4. The component according to claim 1, wherein the difference between the melting temperature of the substrate and the melting temperature of the optical film is about 100 to 200° F.

5. The component according to claim 1, wherein the substrate consists of a polycarbonate.

6. The component according to claim 1, wherein the bonding film consists of a polycarbonate.

7. The component according to claim 1, wherein the adhesive layer is a pressure sensitive adhesive layer.

8. The component according to claim 1, wherein the optical film consists of a cyclic olefin polymer.

9. The component according to claim 1, wherein the bonding film is in direct contact with the substrate.

10. The component according to claim 1, wherein the substrate and the bonding film have a difference between melting temperatures of about 30° F.

11. The component according to claim 1, wherein the bonding film, adhesive layer, and optical film are laminated together to form the laminate that is bonded to a substrate.

12. A method comprising:
   providing a substrate having a melting temperature in a first temperature range;
   providing a bonding film having a melting temperature in the first temperature range;
   providing an adhesive layer;
   providing an optical film having a melting temperature in a second temperature range;
   laminating the bonding film, the adhesive layer, and optical film together; and
   bonding the laminate to the substrate to form the component according to claim 1,
   wherein a difference between the melting temperature of the substrate and the melting temperature of the optical film is about 50 to 250° F.

13. The method according to claim 12, wherein the first temperature range is about 140 to 220° F.

14. The method according to claim 12, wherein the second temperature range is about 250 to 450° F.

15. The method according to claim 12, wherein the bonding film comprises a polycarbonate.

16. The method according to claim 12, wherein the adhesive layer is a pressure sensitive adhesive layer.

17. The method according to claim 12, wherein the optical film comprises a cyclic olefin polymer.

18. The method according to claim 12, wherein the bonding the laminate to the substrate includes bonding the bonding film in direct contact with the substrate.

19. The method according to claim 12, wherein the bonding the laminate to the substrate comprises thermal bonding the laminate to the substrate.

20. A component comprising:
   a substrate having a melting temperature in a first temperature range; and
   a laminate bonded to the substrate, the laminate comprising:
   a bonding film having a melting temperature in the first temperature range;
   an adhesive layer wherein the bonding film and the adhesive layer have cut outs so that only the optical film is in an optical path of an analytical instrument; and
   an optical film having a melting temperature in a second temperature range.

* * * * *